United States Patent [19]

Stannard

[11] Patent Number: 4,946,056

[45] Date of Patent: Aug. 7, 1990

[54] FABRICATED PRESSURE VESSEL

[75] Inventor: James H. Stannard, Basking Ridge, N.J.

[73] Assignee: Buttes Gas & Oil Co. Corp., Houston, Tex.

[21] Appl. No.: 324,020

[22] Filed: Mar. 16, 1989

[51] Int. Cl.$^5$ .......................... B65D 8/00; B65D 90/00
[52] U.S. Cl. .......................................... 220/3; 220/3; 220/5 A; 220/67
[58] Field of Search ..................... 220/3, 1 B, 5 A, 67; 72/367; 228/60, 173.4

[56] References Cited

U.S. PATENT DOCUMENTS

| | | | |
|---|---|---|---|
| 1,424,359 | 8/1922 | Isgrig | 220/66 |
| 2,672,254 | 3/1954 | Boardman | 220/3 |
| 2,673,001 | 3/1954 | Ulm et al. | 220/1 B |
| 3,608,767 | 9/1971 | Elliott et al. | 220/3 |
| 4,182,254 | 1/1980 | Secord | 220/5 A |
| 4,356,925 | 11/1982 | Gerhard | 220/5 A |
| 4,374,478 | 2/1983 | Secord et al. | 220/1 B |

FOREIGN PATENT DOCUMENTS

| | | | |
|---|---|---|---|
| 1229048 | 11/1966 | Fed. Rep. of Germany | 220/3 |
| 1290641 | 12/1962 | France | 220/1 B |
| 2032506 | 5/1980 | United Kingdom | 220/5 A |
| 2040430 | 8/1980 | United Kingdom | 220/5 A |

Primary Examiner—Stephen Marcus
Assistant Examiner—Stephen Castellano
Attorney, Agent, or Firm—Melvin R. Stidham

[57] ABSTRACT

A small tank or vessel for the containment of pressurized fluids is formed by joining the outer edges of the arms of integral upright and inverted double-Y sections arranged side by side. The arms are part cylinders terminating in the vertical centerline of a cylinder so that a septum between adjacent cylindrical lobes is formed by the vertical legs of the double-Y. A semi-cylindrical shell may be attached to the outer arms of each outside double-Y form.

10 Claims, 3 Drawing Sheets

FABRICATED PRESSURE VESSEL

BACKGROUND OF THE INVENTION

This invention relates to the structure and fabrication of small tanks or vessels to be used for the transport, storage or utilization of pressurized fluids. More specifically, it is the purpose of this invention to provide a small tank formed of multiple side by side basically cylindrical lobes, which are joined in a nearly rectangular overall configuration to provide a tank having the volumetric capacity of present gasoline or diesel automotive or motor vehicle fuel tanks, together with the strength characteristics of cylindrical tanks to accommodate pressurized fluids. Relatively large multi-lobed tanks for the transport of pressurized fluids in marine vessels, or for the land storage of such pressurized fluids are shown and described in Secord U.S. Pat. No. 4,182,254 for "Tanks for the Storage and Transport of Fluid Media Under Pressure." It would be desirable to extend this basic technology to enable relatively inexpensive and commercially feasible fabrication of small tanks, such as automotive fuel tanks, which are capable of handling fluids under pressure. The pressure containing capability of such a multi-lobed tank would permit its use for compressed gases, such as natural gas or hydrogen, or for liquefied gases, such as propane or butane. In general, pressurized fuel systems eliminate the problems associated with fuel evaporation or the need for vapor recovery during filling, both of which are recognized concerns of environmental protection. Moreover, the multi-lobed configuration would enable the fabrication of a near-rectangular vessel that could be accommodated in the space presently required for motor vehicle gasoline or diesel fuel tanks.

It is generally accepted knowledge that the hoop forces generated in a thin walled cylindrical vessel, as a result of internal pressure, are always tensile and tangential, and that the hoop stress in the wall of a cylindrical tank under pressure is proportional to the internal pressure, as well as to the radius of curvature of the cylindrical vessel.

Of course, in the case of a rectangular vessel with planar surfaces, the radius of curvature is infinite and, therefore, the stress is also infinite, even at a very low internal pressure. In actual practice, there is some deflection of the flat surface and the stress is actually finite. However, it is of considerable magnitude, and the ability of a rectangular vessel, or any vessel with flat walls, to withstand internal pressure is minimal. Therefore, tanks for the storage and/or transportation of pressurized fluids are generally made cylindrical or spherical. The multi-lobed vessel illustrated and described in the aforesaid U.S. Pat. No. 4,182,254 provides a means of approaching the volumetric economy of a rectangular tank, while limiting the working stresses of the vessel to that of a cylindrical tank with a modest radius of curvature.

OBJECTS OF THE INVENTION

It is an object of this invention to provide a small, easily transported tank which is capable of accommodating fluids under pressure.

It is a further object of this invention to provide for the reliable and economic fabrication of small, multi-lobed tanks to accommodate fluids under pressure.

It is a further object of this invention to facilitate the fabrication of small multi-lobed tanks through the use of substantial components that are preformed, as by extruding, casting or forging.

It is a further object of this invention to provide a strong, multi-lobed tank to accommodate liquid fuels under pressure.

It is a further object of this invention to provide a fuel tank having greater strength than conventional fuel tanks.

It is a further object of this invention to provide a small multi-lobed tank comprising easily assembled and sealed preformed components.

Other objects and advantages of this invention will become apparent from the description to follow, particularly when read in conjunction with the accompanying drawings.

SUMMARY OF THE INVENTION

In carrying out this invention I provide a small tank for pressurized fluids made up of a single tier of basically cylindrical lobes arranged side by side and welded together with a planar septum between each lobe. Each septum is preformed as part of an integral double-Y configuration, one Y-form upright and one Y-form inverted with a single integral leg between them forming the septum. The arms at both top and bottom are arcuate to form essentially two approximately half cylinders back to back. A plurality of such double Y's may be joined in a row by joining and sealing the outer ends of the partial cylindrical arms. The two sides of the overall tank are then completed and sealed by securing a semi-cylindrical member to the exposed half cylinder at each side. The ends of the lobes are closed by generally hemispherical domes.

DETAILED DESCRIPTION OF A PREFERRED EMBODIMENT

Figure 1:
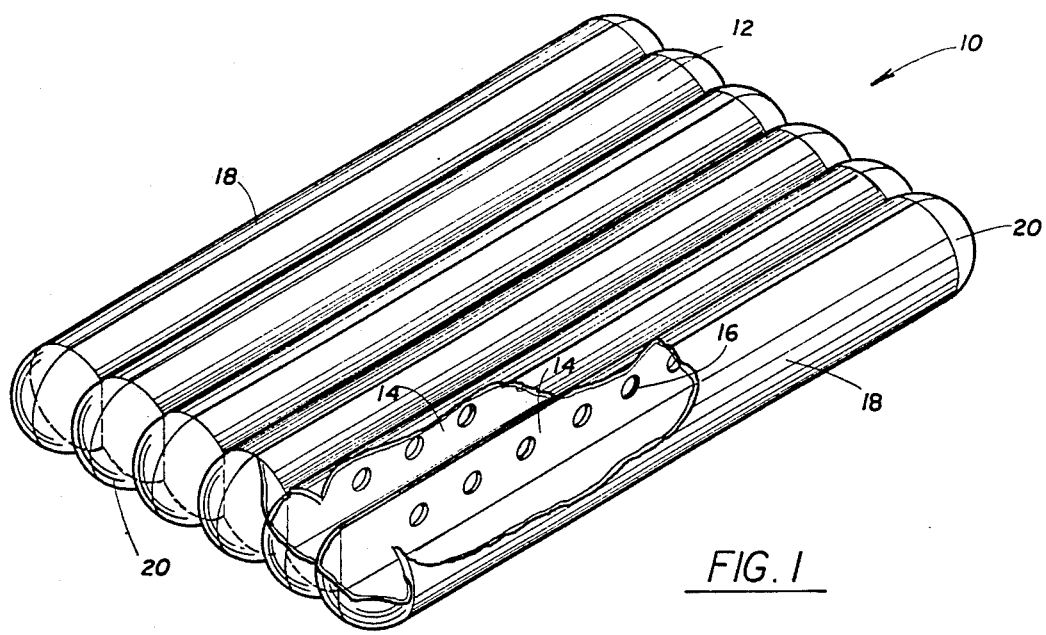
FIG. 1 is a view in perspective, partially broken away of a multi-lobed tank fabricated in accordance with this invention.

Referring now to FIG. 1 with greater particularity, the multi-lobed tank 10 of this invention comprises a series of basically cylindrical lobes 12 connected side by side and separated by planar septa 14. Openings or ports 16 in the septa 14 enable fluid communication between the lobes 12. With the lobes 12 being joined side by side, the overall configuration of the tank 10 approaches a rectangular shape with semi-cylindrical shells 18 forming the side walls. The ends of each pair of joined lobes 12 including the side loes with semi-cylindrical shells 18, are closed by a generally hemispherical dome 20.

Figure 2:
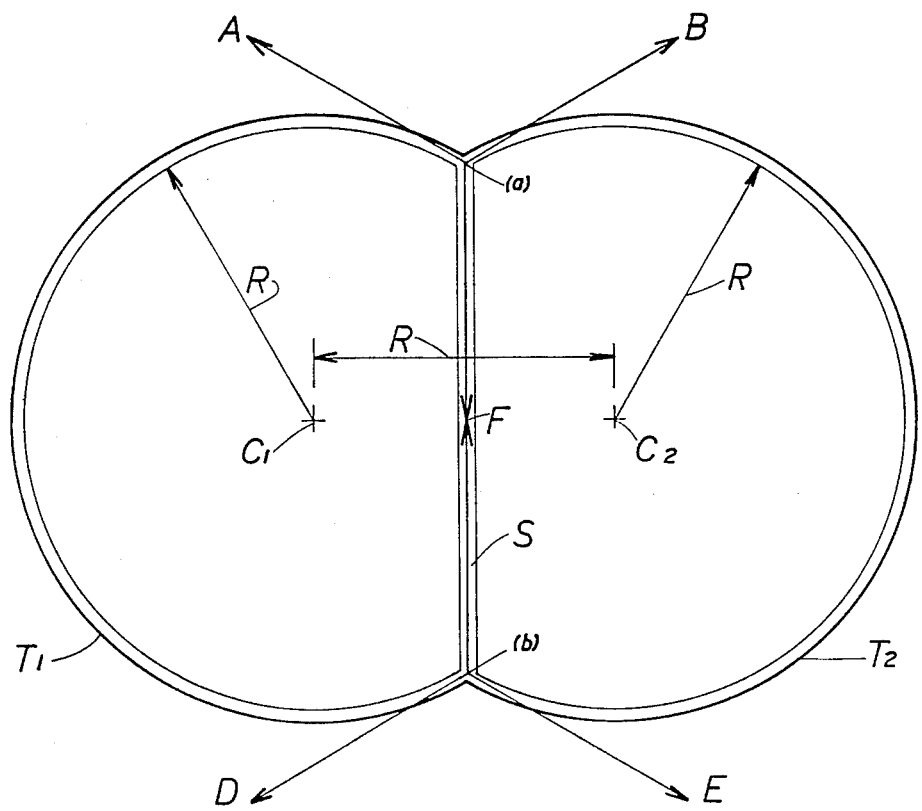
FIG. 2 is a section view of a double lobed tank on which is superimposed a vector diagram representing four equal opposing forces acting about two points.

Referring now to FIG. 2 there is shown a pair of cylindrical tanks T1 and T2 of the same radius of curvature R that are merged together to form a single two-lobed tank with a common planar septum S. If the pressure within the two lobes is equal, as would be the case wherein the septum S is perforated, the hoop forces resulting from that internal pressure would be equal and tangential, as represented by the vectors A, B, D, E and F, and the system will be in static equilibrium.

It has been determined that, with the distance between the centers of curvature C1 and C2 equal to the radius of curvature R, the force imposed upon the septum S equals the hoop stress in each vessel T1 and T2. With the vectors F between the points (a) and (b) being equal and opposite, the force system illustrated in FIG. 2 is also in static equilibrium.

If the distance between the centers of curvature C1 and C2 is made greater than R, the forces in the septum S will be larger, but they will be predictable and manageable, as by controlling the thickness of the septum S.

The use of Y-inserts to make welded joints between lobes and between sections of the septa S are shown in the foresaid U.S. Pat. No. 4,182,254. The use of such Y-inserts would generally require that the tanks be large enough to enable the welder and the inspector to enter the tank and have sufficient room to perform their respective tasks while inside.

Figure 3:
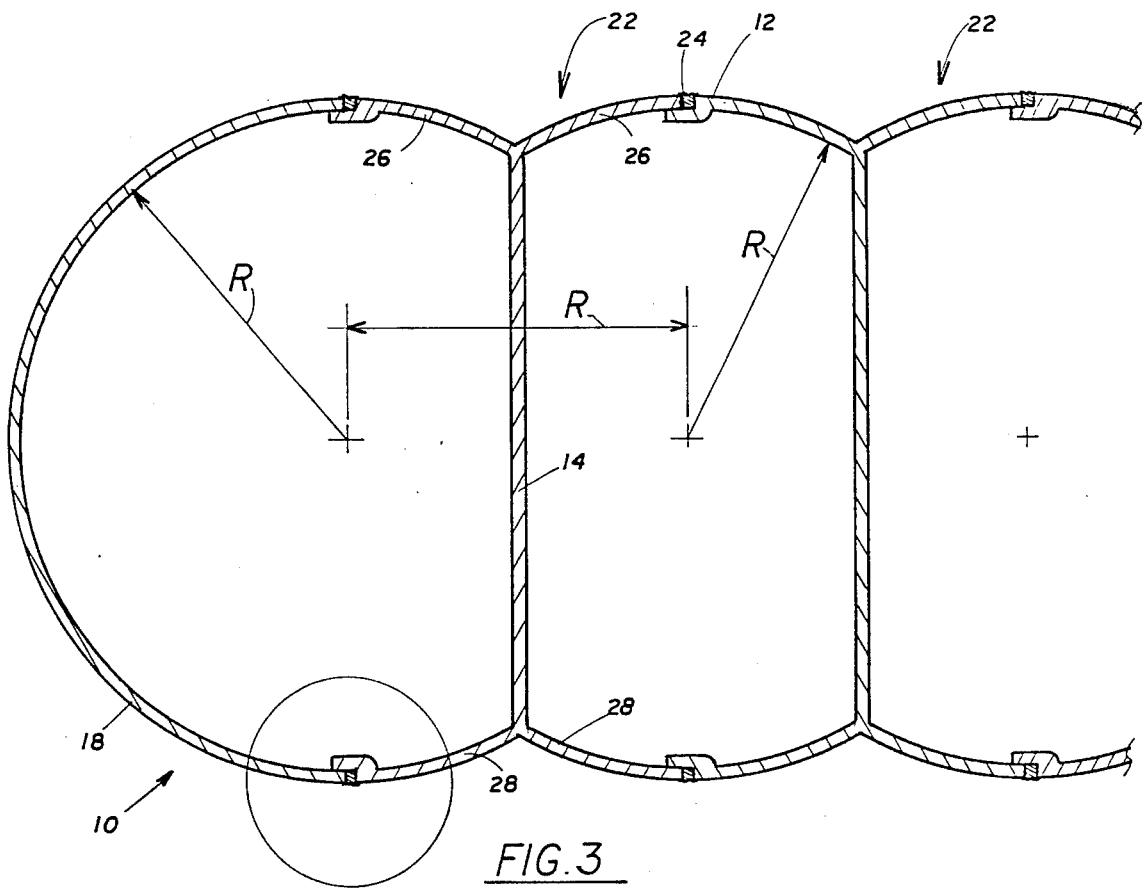
FIG. 3 is a partial view in section of a multi-lobed tank.
Figure 4:
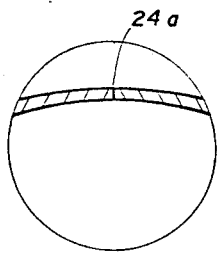
FIGS. 4, 5, 6, 7 and 8 are partial section views showing various joints between lobes of the tank.
Figure 5:
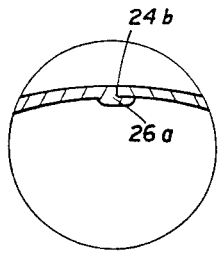
Figure 6:
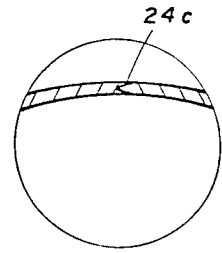
Figure 7:
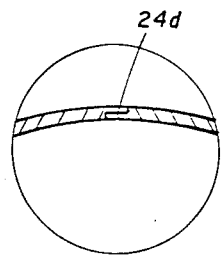
Figure 8:
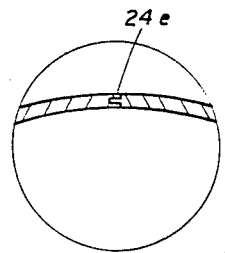

Referring now to FIG. 3 there is shown a series of double-Y elements 22, which are joined and sealed together, as by welding at 24 to form the lobes 12. Each integral double-Y element 22 comprises an upright Y with upper arcuate arms 26 preferably forming one half of the top cylindrical shells of two adjacent lobes 12 and an inverted Y with bottom arcuate partially cylindrical arms 28 preferably forming one half of the bottom cylindrical shells of the same adjacent lobes 12. The septum 14 is formed by the legs of the integral upright and inverted Y's, which are of unitary construction with the arcuate arms 26 and 28. As shown, the side wall 18 of the overall tank 10 is formed by a semi-cylindrical shell.

The double-Y insert 22 of this invention may be separately fabricated prior to assembly with other double Y inserts, but are preferably extruded, forged, rolled or cast in one-piece construction. The double-Y element which incorporates the septum, both Y's and half of the curved section of both lobes adjoining the septum, may be used in the fabrication of very small tanks, such as lobed tanks 10 with a radius of curvature R of about one foot or less. It is to be understood that there may be as many lobes 12 as desired, and the lobes may be as long as desired, within the scope of this invention.

FIGS. 4 to 8 illustrate several possible methods of joining the partial cylindrical shells 26 together to form the lobes, and the particular method used would depend upon the material and/or joining technique. For example, the simple flat butt joint 24a of FIG. 4 might prove ideal for the solvent or thermal fusion of plastic elements or the brazed or soldered joining of metallic elements. In the joint 24 shown in FIG. 3 and that shown at 24b in FIG. 5, the end 26a of one arcuate leg 26 or 28 is formed to provide a backing strip of a one-sided butt weld 24. The tongue and groove or lap variations 24c, 24d, and 24e of FIGS. 6, 7 and 8 might also be used for solvent or thermal fusion of plastic elements or brazing or soldering metallic elements.

Figure 9:
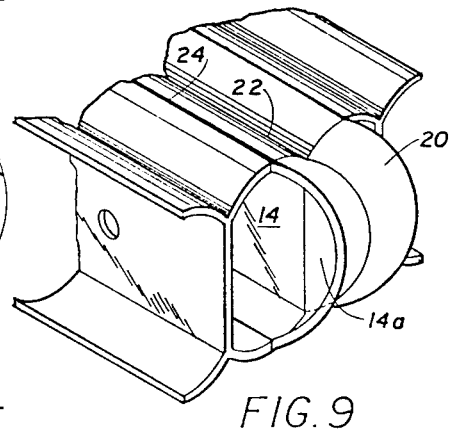
FIG. 9 is a partial view in perspective of a lobe end closure.

In addition to the hoop forces previously described herein, a cylindrical vessel is subjected to a longitudinal force resulting from the pressure acting against the end closure 20. The longitudinal stress in a cylindrical tank is one half the hoop stress in a cylindrical tank of the same radius of curvature. This is based on the assumption that the restraint of the end closure is continuous around the periphery of the vessel. In the multi-lobed tank shown in FIG. 1 with spherical end closures 20, it is important that the longitudinal forces be shared between the septa 14 and the curved partial cylinder portions 12 and 18 of the tank 10. If just the curved sections of the tank are subjected to the longitudinal forces, the tank herein described wherein the distance between centers C1 and C2 equals the radius of curvature R, the longitudinal stress will be equal to approximately one and one half times the hoop stress. Such a structure is shown in FIG. 9 wherein the septum 14a separating the half domes 20 is joined as by welding to the septum 14. Such a septum could be welded or brazed in the case of a metal tank, or it could be solvent or thermally fused in the case of a plastic tank.

Figure 10:
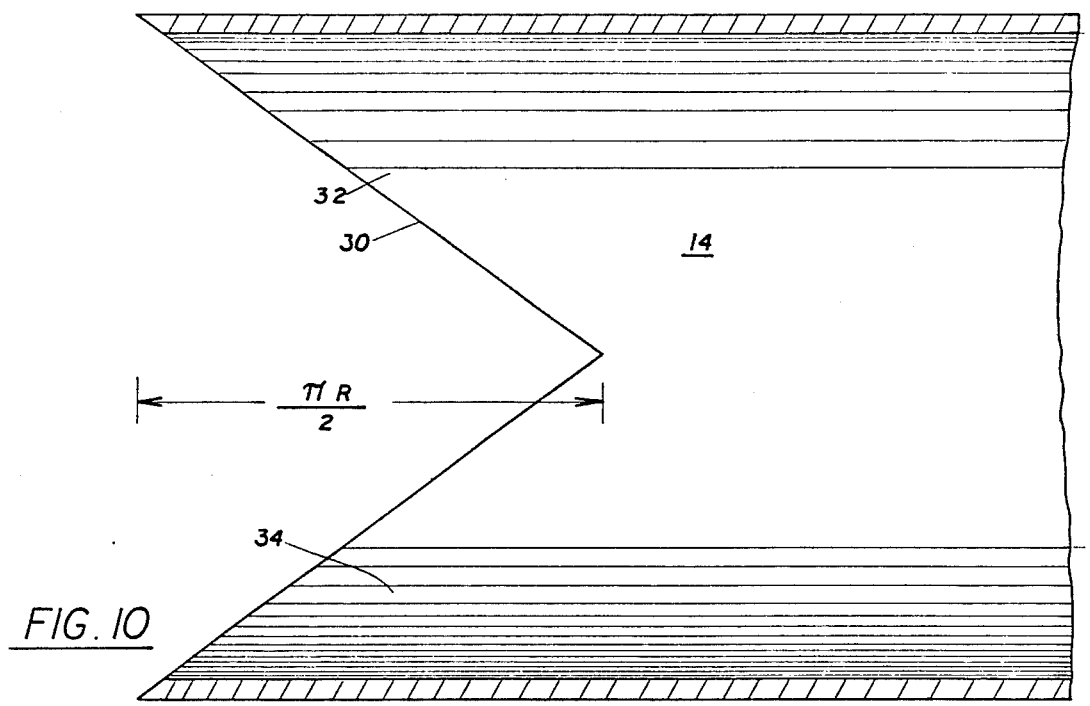
FIG. 10 is a side view of a double Y-form as cut for formation of a lobe end dome.
Figure 11:
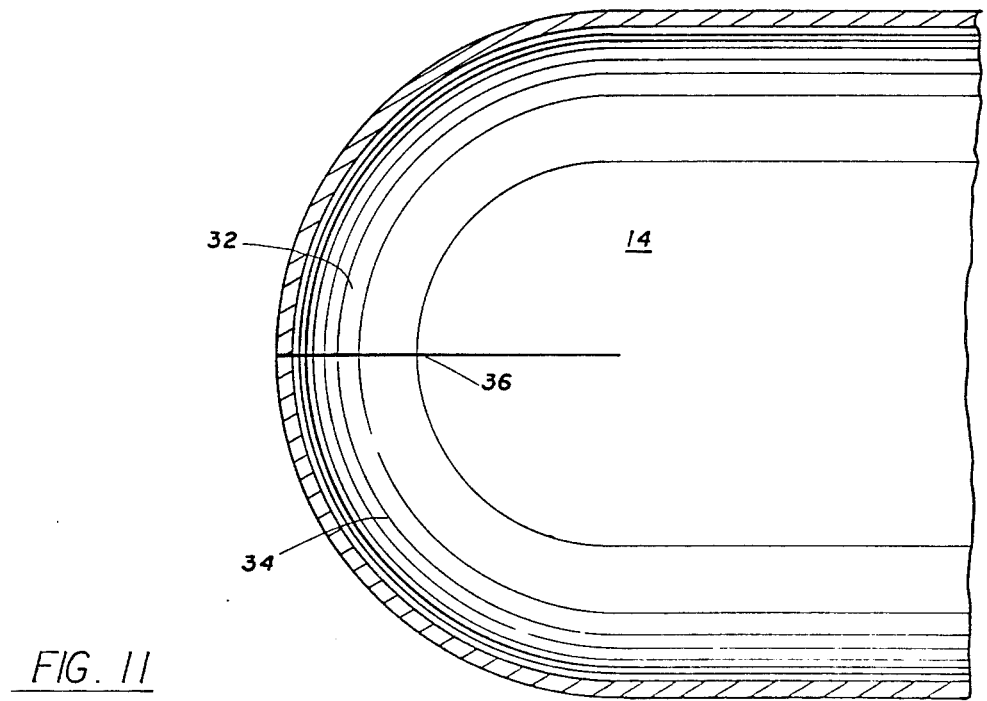
FIG. 11 is a side view showing one formed end of a double Y-form.

The end closure shown in FIG. 9 can be forged, drawn or cast. If desired, such a domed closure could be formed by cutting a large triangular cut from the septum of a cylindrical lobe and then bending the ends together in a spherical form. This is shown in FIGS. 10 and 11 wherein a triangular cut 30 is made in each end of the double-Y section to an approximate depth, such as about $\pi R/2$. Then, the ends 32 and 34 are bent together and welded at 36 to form a pair of half domes with integral septum 14.

The necessary penetrations and fittings for filling and emptying the tank 10, or for pressure relief protection, gauging and the like are not part of this invention and, therefore, are not specifically disclosed herein. Such fittings may be located as desired.

While this invention has been described in conjunction with a preferred embodiment thereof, it is obvious that modifications and changes therein may be made by those skilled in the art to which it pertains without departing from the spirit and scope of this invention, as defined by the claims appended hereto.

Having described my invention, I claim:

1. A fluid tank comprising:
   a first internal septum formed by one unitary pair of upright and inverted Y-shapes with generally vertical legs joined together bottom to bottom, each Y-shape having two laterally extending arcuate arms;
   the arms of said one pair of Y-shapes being internally concave, each part and together forming back to back generally semi-cylinders of a predetermined radius terminating in straight top and bottom outer edges in first and second common vertical planes; and
   a side wall comprising a semicylinder of said predetermined radius terminating at top and bottom in straight inner edges in said first common vertical, plane sealed along said inner edges to the outer edges of a top and bottom pair of arms of said first internal septum to form an outer, generally cylindrical lobe therebetween.

2. The fluid tank defined by claim 1 including:
   a second internal septum formed by an other unitary pair of said upright and inverted Y-shapes with generally vertical legs joined together bottom to bottom, each Y-shape having two laterally extending arcuate arms;
   the arms of said other pair of Y-shapes being internally concave, and together facing back to back generally semi-cylinders of said predetermined radius terminally in straight top and bottom outer edges in said second common vertical plane and a third common vertical plane; and the outer edges of said internal septa being secured and sealed together along said second common vertical plane to form an interior, generally cylindrical lobe therebetween.

3. The fluid tank defined by claim 2 including: means enabling fluid communication across said internal septa.

4. The fluid tank defined by claim 1 including:
end walls closing off the space between said first internal septum and said side wall.

5. The fluid tank defined by claim 2 including:
end closures closing off the front and rear ends of said lobes formed between said first and second internal septa and between said first internal septa and side wall.

6. The fluid tank defined by claim 5 wherein:
said end closures are of substantially hemispherical configuration; and including:
a semi-circular dividing wall on the vertical diameter of said end closure sealed to one of said internal septa.

7. The fluid tank defined by claim 5 wherein:
the end closures closing off the ends of the lobes formed between first and second septa are formed by notching said ends; and
bending said ends together to form a back-to-back integral pair of half domes.

8. The fluid tank defined by claim 1 wherein:
said pair of upright and inverted Y-shapes are of one-piece construction.

9. A fluid tank comprising:
a first internal septum formed by one unitary pair of upright and inverted Y-shapes with generally vertical legs joined together bottom to bottom, each Y-shape having two laterally extending arcuate arms;

the arms of said one pair of Y-shapes on each side of said septum together forming internally concave, generally semi-cylinders of a predetermined radius terminating in straight opposing outer edges along first and second parallel planes, each on a centerline of a cylinder of said predetermined radius; and a side wall of comprising a semi-cylinder of said predetermined radius terminating at top and bottom in straight inner edges along said first plane, sealed along said inner edges to the outer edges of said first internal septum to form an outer generally cylindrical lobe therebetween.

10. The fluid tank defined by claim 9 including:
a second internal septum formed by another unitary pair of said upright and inverted Y-shapes with generally vertical legs joined together bottom to bottom, each Y-shape having two laterally extending arcuate arms;

the arms of said Y-shapes being internally concave and on one side of said second septum terminating in outer edges along said second plane, and on the other side of said second septum terminating in outer edges in a third plane parallel to said first and second planes;

the outer edges of said internal septa being secured and sealed together along said second plane to form an interior lobe therebetween.

* * * * *